US012703458B2

(12) United States Patent
Chen et al.

(10) Patent No.: US 12,703,458 B2
(45) Date of Patent: Aug. 11, 2026

(54) HUB MOTOR

(71) Applicant: TIEN HSIN INDUSTRIES CO., LTD., Taichung City (TW)

(72) Inventors: Chun-Wei Chen, Taichung City (TW); Chang-Chun Kao, Taichung City (TW); Chien-Mo Lu, Taichung City (TW); Chin-Wen Ou, Taichung City (TW); Yu-Chen Wu, Taichung City (TW); Ming-Lan Ou, Taichung City (TW)

(73) Assignee: TIEN HSIN INDUSTRIES CO., LTD., Taichung City (TW)

( * ) Notice: Subject to any disclaimer, the term of this patent is extended or adjusted under 35 U.S.C. 154(b) by 422 days.

(21) Appl. No.: 18/369,215

(22) Filed: Sep. 18, 2023

(65) Prior Publication Data

US 2025/0091691 A1 Mar. 20, 2025

(51) Int. Cl.

| | |
|---|---|
| ***B62M 6/65*** | (2010.01) |
| ***H02K 1/12*** | (2006.01) |
| ***H02K 1/22*** | (2006.01) |
| ***H02K 5/04*** | (2006.01) |

(52) U.S. Cl.

CPC ................. *B62M 6/65* (2013.01); *H02K 1/12* (2013.01); *H02K 1/22* (2013.01); *H02K 5/04* (2013.01)

(58) Field of Classification Search

CPC .. B62M 6/65; H02K 5/04; H02K 1/22; H02K 1/12

USPC ........................ 180/206.6, 206.5, 65.51, 220

See application file for complete search history.

(56) References Cited

U.S. PATENT DOCUMENTS

| | | | | |
|---|---|---|---|---|
| 8,419,580 | B2 * | 4/2013 | Lo | A61G 5/04 475/5 |
| 12,115,859 | B2 * | 10/2024 | Yang | H02K 5/225 |
| 12,145,692 | B2 * | 11/2024 | Dodman | B62J 43/13 |
| 2013/0284527 | A1 * | 10/2013 | Murakami | B60L 15/2054 477/8 |
| 2023/0278665 | A1 * | 9/2023 | Lu | H02K 7/003 180/65.51 |
| 2024/0383566 | A1 * | 11/2024 | Chen | B62M 6/65 |
| 2024/0383568 | A1 * | 11/2024 | Chen | B62M 6/65 |
| 2025/0091692 | A1 * | 3/2025 | Chen | B62M 6/65 |
| 2025/0300525 | A1 * | 9/2025 | Hsu | H02K 7/116 |

FOREIGN PATENT DOCUMENTS

JP 2012228966 A * 11/2012

OTHER PUBLICATIONS

JP2012-228966, English Abstract. (Year: 2012).*

* cited by examiner

*Primary Examiner* — Anne Marie M Boehler

(57) ABSTRACT

A hub motor includes an axle, a rotor, a stator, and a casing. The axle is fixed to a frame of a bicycle. The rotor is sleeved on the axle and pivots with the axle. The stator is fixed to the axle and adjacent to the rotor. The casing is sleeved on the axle and driven by the rotor to pivot with the axle. The casing has an accommodating space, a first perforation, and a second perforation. The accommodating space accommodates the stator and the rotor. The axle includes a first component and a second component. The first component is sleeved on the second component. The first component is arranged to pass through the first perforation. The second component is arranged to pass through the second perforation. The first component and the second component cannot rotate relative to each other after being sleeved.

8 Claims, 8 Drawing Sheets

HUB MOTOR

FIELD OF THE INVENTION

The present disclosure relates to a motor, and more particularly to a hub motor mounted on a bicycle.

BACKGROUND OF THE INVENTION

A hub motor is a motor that drives a casing to rotate by means of an internal mechanism. When being applied to a bicycle, the hub motor is mounted on the front wheel or the rear wheel of the bicycle, and the casing of the hub motor is connected to the front wheel or the rear wheel. Thus, the hub motor can serve as an auxiliary power of the bicycle to drive the wheels to rotate so as to assist a rider of the bicycle.

The casing of the hub motor must rotate relative to the frame so that most hub motors have non-rotatable axles. The axle is required to support the whole bicycle and the weight of the rider and is also required to serve as a rotating shaft for the casing of the hub motor and other components. Therefore, the axle is required to have relatively high accuracy and facilitate the replacement and mounting requirements of other parts.

SUMMARY OF THE INVENTION

The present disclosure provides a hub motor, an axle thereof has the advantage of convenience in mounting, the mounting accuracy of various assemblies can be improved, and the assemblies of the hub motor can be prevented from producing errors due to wear caused by the torque.

In order to achieve the above-mentioned advantages, an embodiment of the present disclosure provides a hub motor adapted to be mounted on a bicycle. The hub motor includes an axle, a rotor, a stator, and a casing. The axle is fixed to a frame of the bicycle and has a first end and a second end opposite each other in an extension direction. The rotor is sleeved on the axle and pivots with the axle as an axis. The stator is fixed to the axle and adjacent to the rotor. The casing is sleeved on the axle and driven by the rotor to pivot with the axle as an axis. The casing has an accommodating space, a first perforation, and a second perforation opposite to the first perforation. The accommodating space accommodates the stator and the rotor. The axle includes a first component and a second component in the extension direction. The first component is sleeved on the second component. The first component is arranged to pass through the first perforation and includes a first mounting portion and a second mounting portion located in the accommodating space. The first mounting portion is fixedly connected to the stator. The second mounting portion is connected to the second component. The second component is arranged to pass through the second perforation and includes a supporting portion and a connecting portion located in the accommodating space. The rotor is rotatably sleeved on the supporting portion. The second mounting portion is detachably sleeved on the connecting portion. The first component and the second component cannot rotate relative to each other after being sleeved.

In an embodiment, a radial-outer surface of the connecting portion is provided with a groove recessed towards the axis of the axle in a radial direction, and the groove has a sliding-fit surface.

In an embodiment, the first component includes a mounting section and a sleeve section in the extension direction. The mounting section is close to the first end and is adapted to be connected to the frame. The casing is rotatably sleeved on the sleeve section. The first mounting portion is arranged on a radial-outer side of the sleeve section. The second mounting portion is arranged on a radial-inner side of the sleeve section.

In an embodiment, the sleeve section includes a disc body and a supporting ring. The disc body extends in a radial direction of the axle. The supporting ring surrounds the disc body. The stator is sleeved on the supporting ring.

In an embodiment, an arrangement space is enclosed by the supporting ring, and the rotor is at least partially arranged in the arrangement space.

In an embodiment, the second component includes a bump extending in the radial direction. The sleeve section has a protruding section in the extension direction in the arrangement space. The rotor is sleeved between the protruding section and the bump.

In an embodiment, the disc body has a third perforation in the extension direction, and the second component is recessed in the radial direction to form a wiring channel corresponding to the third perforation and extending in the extension direction.

In an embodiment, an end of the mounting section close to the first end is provided with a flange, and the flange is adapted to be snap-fitted with the frame.

In an embodiment, the first component includes a channel recessed in the radial direction and extending in the extension direction, and the channel is adapted to accommodate a power line electrically connected to the stator.

In an embodiment, the channel includes a first section and a second section. The first section is located in the mounting section. The second section is located in the sleeve section. The second section is in communication with an interior of the sleeve section to face the first component.

According to the above description, in the hub motor of the present disclosure, the axle is divided into the first component to which the stator is fixedly connected and the second component on which the rotor is rotatably sleeved, the first component is detachably sleeved on the second component, and the first component and the second component cannot rotate relative to each other after being sleeved. Thus, the hub motor has the advantages of convenience in mounting and positioning, the mounting accuracy of the various assemblies can be improved, and the assemblies of the hub motor can be prevented from producing errors due to wear caused by the torque.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Figure 1A:
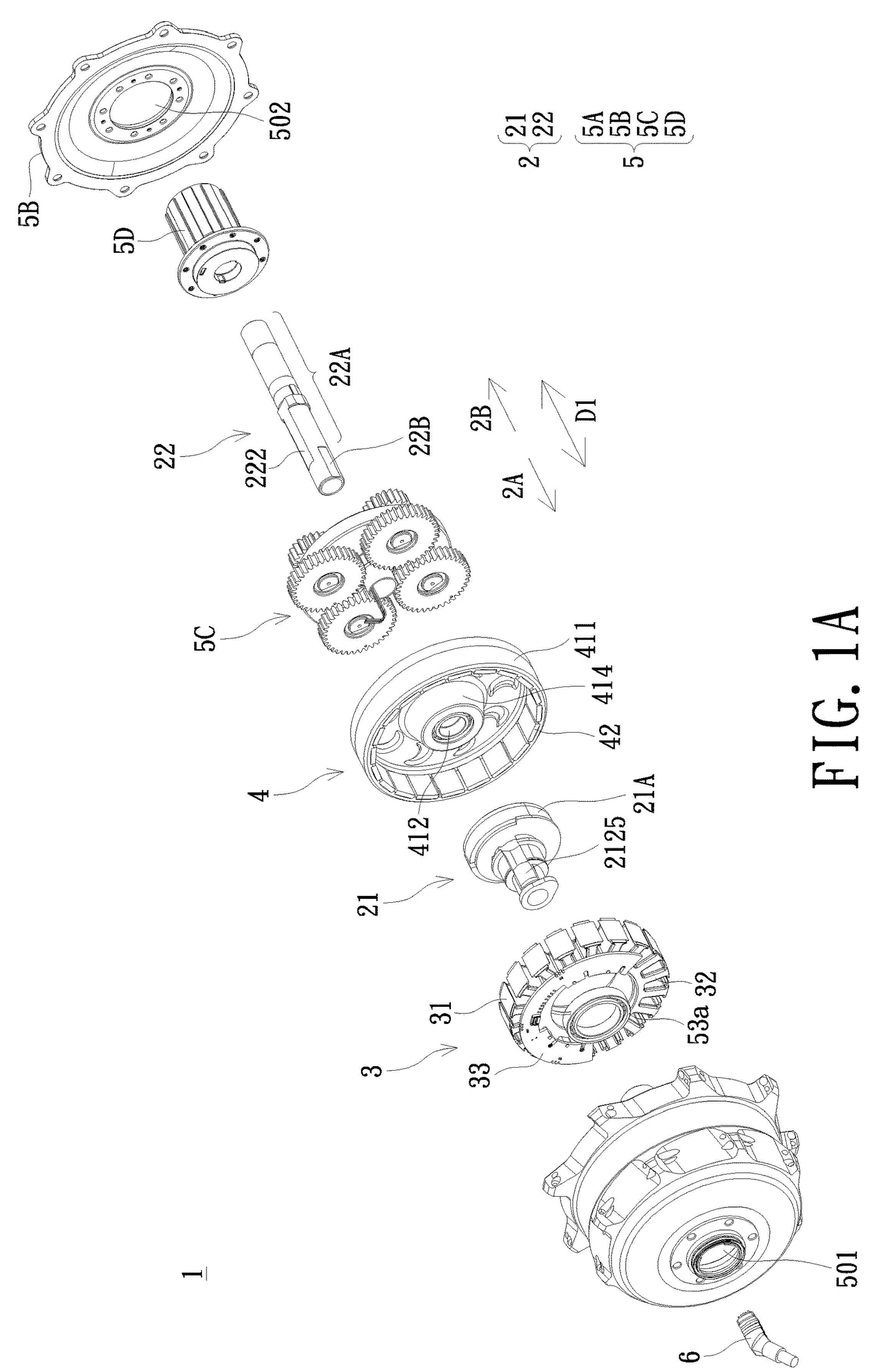
FIG. 1A is an exploded schematic diagram of a hub motor according to an embodiment of the present disclosure.

Terms used in the description of the embodiments of the present disclosure, for example, orientation or position relation such as "above" and "below" are described according to the orientation or position relation shown in the drawings. The above terms are used for facilitating the description of the present disclosure rather than limiting the present disclosure, i.e., indicating or implying that the mentioned elements have to have specific orientations and be configured in the specific orientations. In addition, terms such as "first" and "second" involved in the description or claims are merely used for naming the elements or distinguishing different embodiments or ranges rather than limiting the upper limit or lower limit of the quantity of the elements.

Figure 1B:
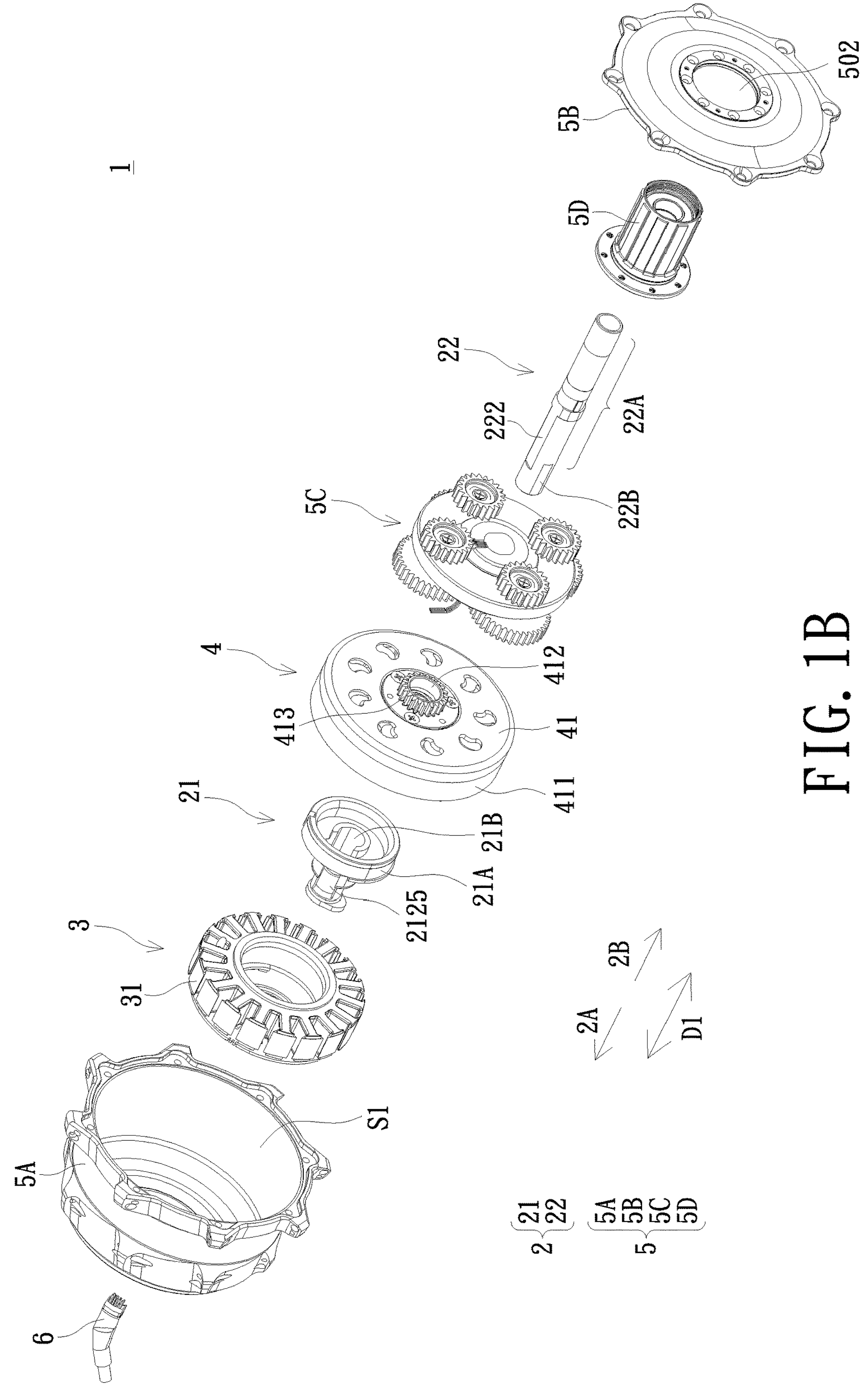
FIG. 1B is an exploded schematic diagram of the hub motor in FIG. 1A at another viewing angle.
Figure 2:
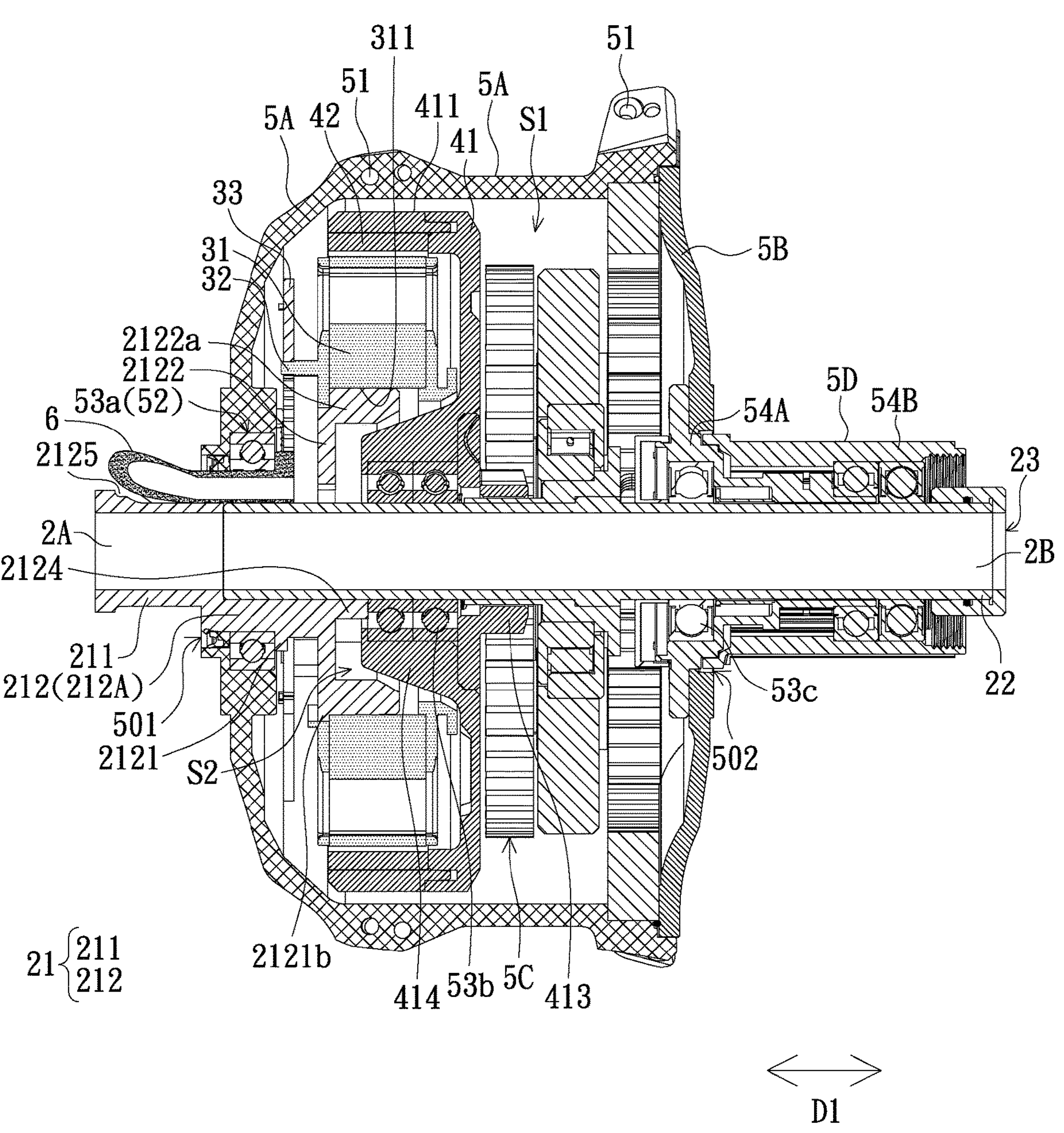
FIG. 2 is a cross-sectional schematic diagram of the hub motor in FIG. 1A.

FIG. 1A is an exploded schematic diagram of a hub motor according to an embodiment of the present disclosure. FIG. 1B is an exploded schematic diagram of the hub motor in FIG. 1A at another viewing angle. FIG. 2 is a cross-sectional schematic diagram of the hub motor in FIG. 1A. As shown in FIGS. 1A to 2, the hub motor 1 provided by this embodiment is adapted to be mounted on a bicycle (not shown) and includes an axle 2, a stator 3, a rotor 4, and a casing 5. The axle 2 is fixed to a frame (not shown) of the bicycle and has a first end 2A and a second end 2B opposite each other in an extension direction D1. The stator 3 is fixed to the axle 2 and is adjacent to the rotor 4. The rotor 4 is rotatably sleeved on the axle 2 and pivots with the axle 2 as an axis. The casing 5 is rotatably sleeved on the axle 2 and is adapted to be driven by the rotor 4 to rotate around the rotor 4 and the axle 2. The casing 5 has an accommodating space S1, a first perforation 501, and a second perforation 502 opposite the first perforation 501 in the extension direction D1. The accommodating space S1 accommodates the stator 3 and the rotor 4.

As shown in FIGS. 1A to 2, in this embodiment, the axle 2 includes a first component 21 and a second component 22 in the extension direction D1. The first component 21 is sleeved on the second component 22. The first component 21 is arranged to pass through the first perforation 501 and includes a first mounting portion 21A and a second mounting portion 21B which are located in the accommodating space S1. The first mounting portion 21A is fixedly connected to the stator 3. The second mounting portion 21B is connected to the second component 22. The second component 22 is arranged to pass through the second perforation 502 and includes a supporting portion 22A and a connecting portion 22B which are located in the accommodating space S1. The rotor 4 is rotatably sleeved on the supporting portion 22A. The second mounting portion 21B is sleeved on the connecting portion 22B and can slide in the extension direction D1 but cannot rotate in the circumferential direction of the axle 2. Please refer to the following description for the detail of the axle 2.

In this embodiment, the hub motor 1 is, for example, mounted on the rear wheel of the bicycle. The axle 2 is, for example, fixed to the frame of the bicycle. The casing 5 is, for example, connected to a plurality of spokes by means of a plurality of spoke holes 51 in the casing 5 thereby being indirectly connected to a wheel frame of the rear wheel of the bicycle so as to drive the rear wheel to rotate during rotation. The mounting position of the hub motor 1 is not limited to the rear wheel.

As shown in FIGS. 1A to 2, in this embodiment, the casing 5 includes, for example, a body 5A, a side cover 5B, and a planetary gear set 5C. The interior of the body 5A forms the accommodating space S1. The spoke holes 51 are located on the outer surface of the body 5A. The side cover 5B is configured to cover an opening (not marked due to the fact that the opening is covered) on one side of the body 5A to protect the assemblies such as the axle 2, the stator 3, the rotor 4, the planetary gear set 5C and the like. The body 5A and the side cover 5B are respectively provided with the first perforation 501 and the second perforation 502 in correspondence with the axis of the axle 2. An arrangement groove 52 is formed around the first perforation 501. The arrangement groove 52 is located in the accommodating space S1 and is configured to accommodate a rolling bearing 53*a*. The casing 5 is rotatably sleeved on the axle 2 (the detailed position will be described below) by means of the rolling bearing 53*a*. The rolling bearing 53*a* is, for example, a radial bearing, but the type of the rolling bearing 53*a* is not limited to this.

As shown in FIGS. 1A to 2, in this embodiment, the stator 3 is, for example, a circular ring body sleeved on the axle 2 and includes an annular electromagnet assembly 31 and an annular snap-fitting disc 32. The snap-fitting disc 32 is, for example, adjacent to a surface of the side of the electromagnet assembly 31 facing the first end 2A and is configured to match with the electromagnet assembly 31 to position the stator 3 on the axle 2 (detailed below). The inner wall surface of the electromagnet assembly 31 forms a supporting cambered surface 311 configured to be in surface contact with the axle 2.

In this embodiment, the stator 3 controls, by means of a control unit 33, the electromagnet assembly 31 mounted on the stator 3. The control unit 33 is, for example, connected to the electromagnet assembly 31 by means of the snap-fitting disc 32 and located in the accommodating space S1, but is not limited to this. Specifically, in other embodiments, the control unit 33 is, for example, mounted at other positions of the bicycle (for example, a controller on a handlebar) and is, for example, electrically connected to the electromagnet assembly 31 in the accommodating space S1 by means of a power line 6 and located outside the accommodating space S1. The electromagnet assembly 31 generates an electromagnetic field by means of a current, provided by the power line 6, to enable, for example, the rotor 4 including magnets 42 to rotate relative to the stator 3. The detailed design of the stator 3 can be changed according to demands and is not limited to the above examples.

As shown in FIGS. 1A to 2, in this embodiment, the rotor 4 is, for example, a circular disc body sleeved on the axle 2 and includes a combination disc 41 and a plurality of magnets 42. The combination disc 41 has, for example, a diameter greater than that of the stator 3 so as to surround the stator 3 during assembly, but is not limited to this. An outer periphery of the combination disc 41 is provided with an outer convex ring 411 extending towards the stator 3 in the extension direction D1, and the plurality of magnets 42 are annularly arranged on a radial-inner side surface of the outer convex ring 411. A through hole 412 is formed in the center of the combination disc 41. The axle 2 is arranged to pass through the center of the combination disc 41 via the through hole 412 to serve as a rotating axis of the rotor 4. The side of the combination disc 41 of the rotor 4 that faces the second end 2B is additionally provided with a sun gear 413 configured to be engaged with the planetary gear set 5C. The sun gear 413 is also rotatably sleeved on the axle 2 to rotate along with the combination disc 41 with the axle 2 as the axis.

As shown in FIGS. 1A and 2, in this embodiment, the rotor 4 is provided with a supporting seat 414 surrounding the through hole 412. The supporting seat 414 extends, for example, towards the stator 3 in the extension direction D1 in a gradually shrunk manner. A radial inner surface of the supporting seat 414 is, for example, sleeved with two rolling bearings 53*b*. The two rolling bearings 53*b* are arranged in the extension direction D1. By means of the above-mentioned structure, the rotor 4 is supported on the axle 2 by means of the two rolling bearings 53*b* arranged in the extension direction D1. Thus, it can be ensured that each magnet 42 can be perpendicular to the axle 2 and rotate in parallel relative to the electromagnet assembly 31 of the stator 3 during rotation of the rotor 4.

When rotating, the rotor 4 drives the planetary gear set 5C by means of the sun gear 413 to drive the casing 5 to rotate. During the rotation of the rotor 4, the magnitude of the current supplied to the electromagnet assembly 31 is, for example, controlled by means of the control unit 33 so as to control the intensity of the magnetic field generated by the electromagnet assembly 31 of the stator 3, thereby changing the rotating speeds of the rotor 4 and the casing 5. The size relationship between the stator 3 and the rotor 4 or the detailed component design can be changed according to demands.

As shown in FIGS. 1A to 2, in this embodiment, the casing 5 further includes, for example, a cassette body 5D on the side cover 5B. The cassette body 5D extends out of the accommodating space S1 via the second perforation 502 and includes an inner tube 54A and an outer tube 54B. The inner tube 54A is fixedly connected to the casing 5 and is rotatably sleeved on the axle 2 by means of a rolling bearing 53*c*. The outer tube 54B is configured to be connected to a sprocket (not shown) of the bicycle. An inner ratchet wheel structure (not shown) is further arranged between the inner tube 54A and the outer tube 54B. The inner ratchet wheel structure is adapted to enable the outer tube 54B to only drive the inner tube 54A to rotate in a movement direction and to be unable to drive the inner tube 54A to rotate when rotating in the direction opposite to the movement direction. Thus, when pedaling, the user can drive the sprockets by means of a chain (not shown) of the bicycle and thereby driving the cassette body 5D and the casing 5 to rotate.

Figure 3A:
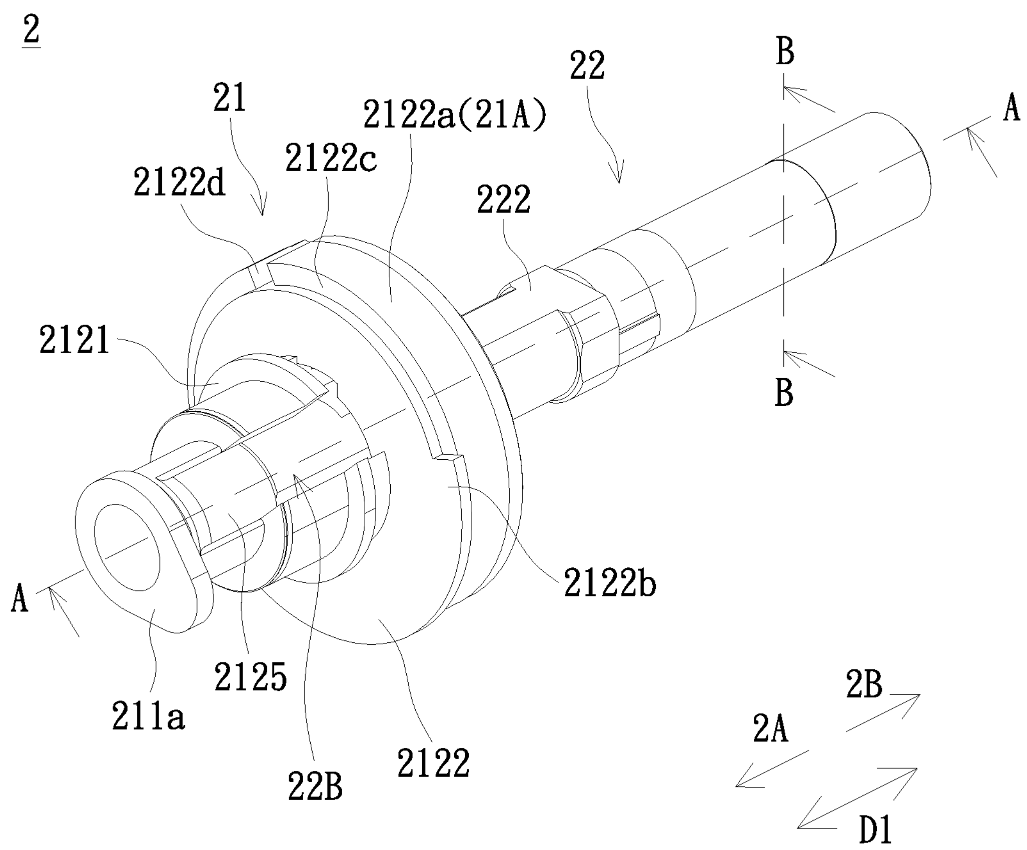
FIG. 3A is a three-dimensional schematic diagram of the axle in FIG. 1A.
Figure 3B:
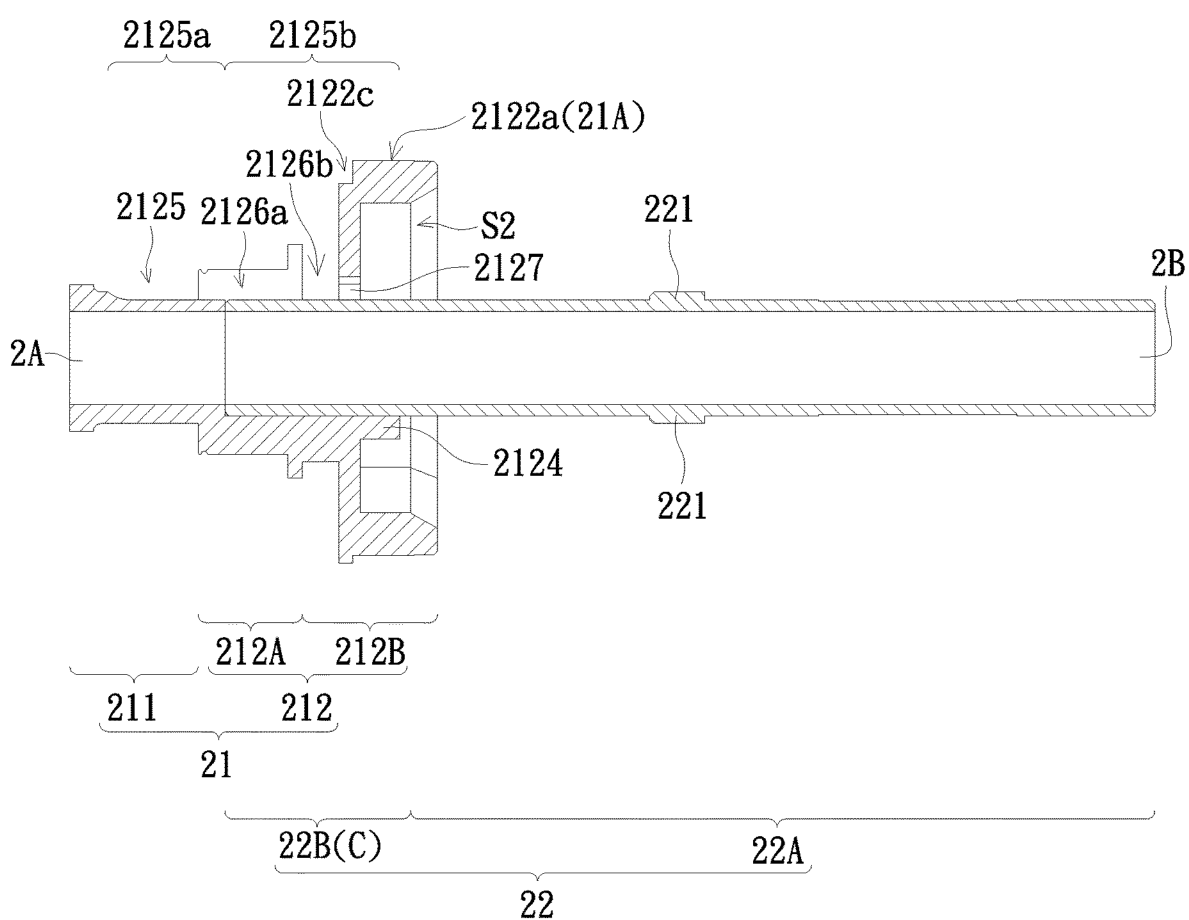
FIG. 3B is a schematic cross-sectional diagram of the axle, taken along the line A-A in FIG. 3A.
Figure 3C:
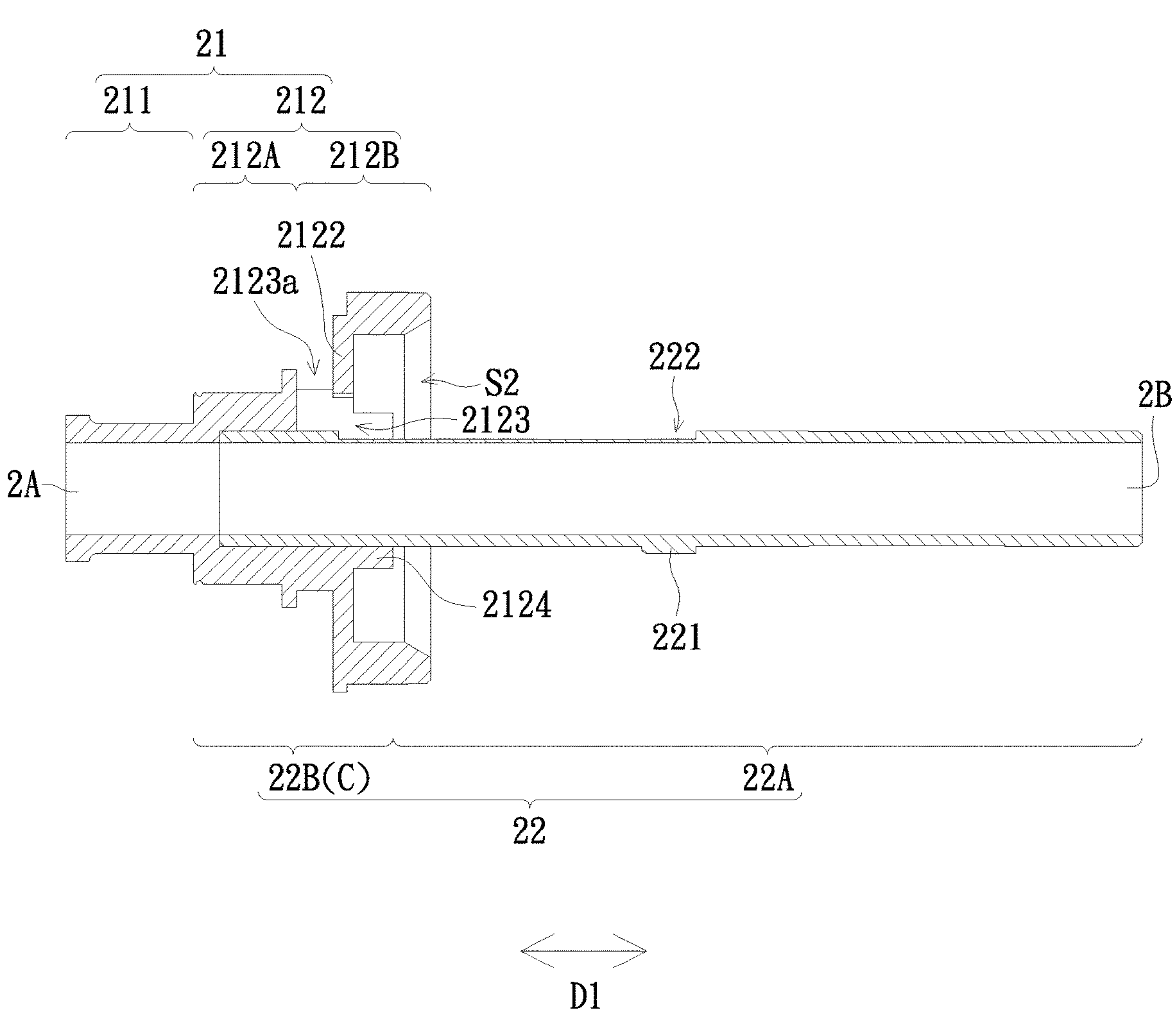
FIG. 3C is a schematic cross-sectional diagram of the axle, taken along the line B-B in FIG. 3A.
Figure 4:
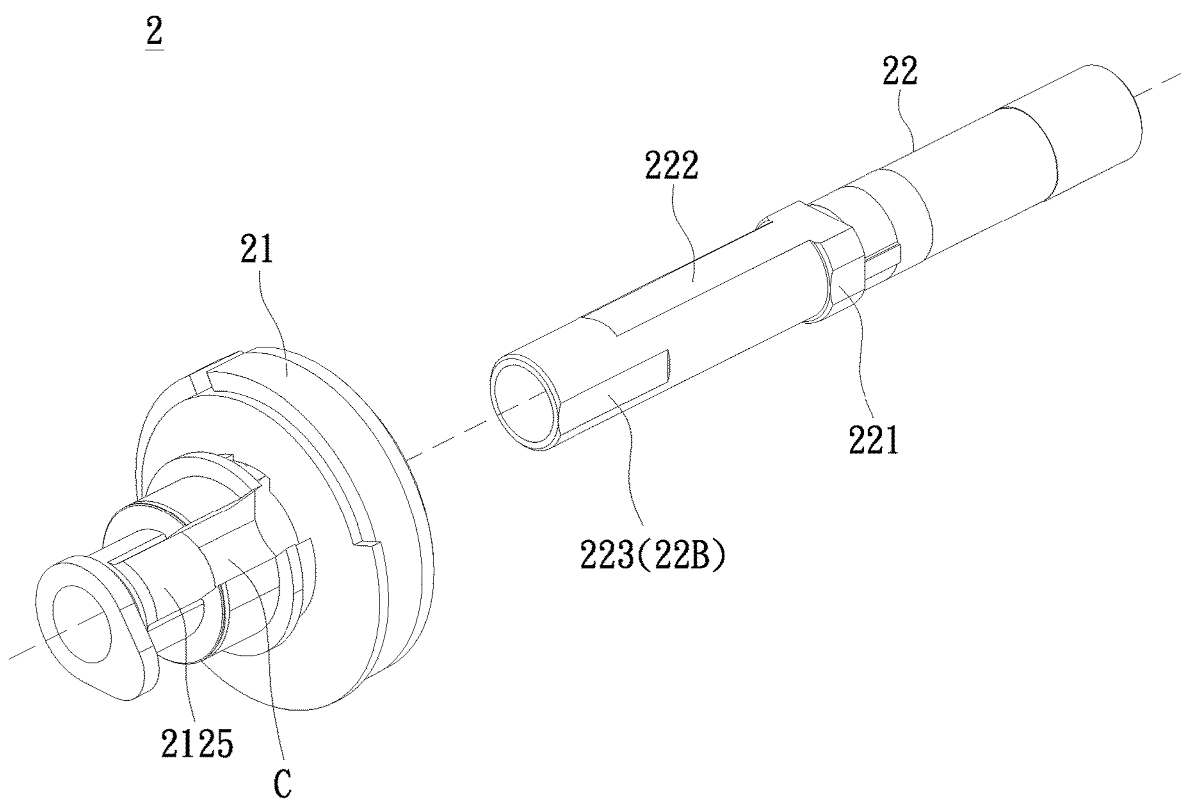
FIG. 4 is a breakdown schematic diagram of the axle in FIG. 3A.
Figure 5:
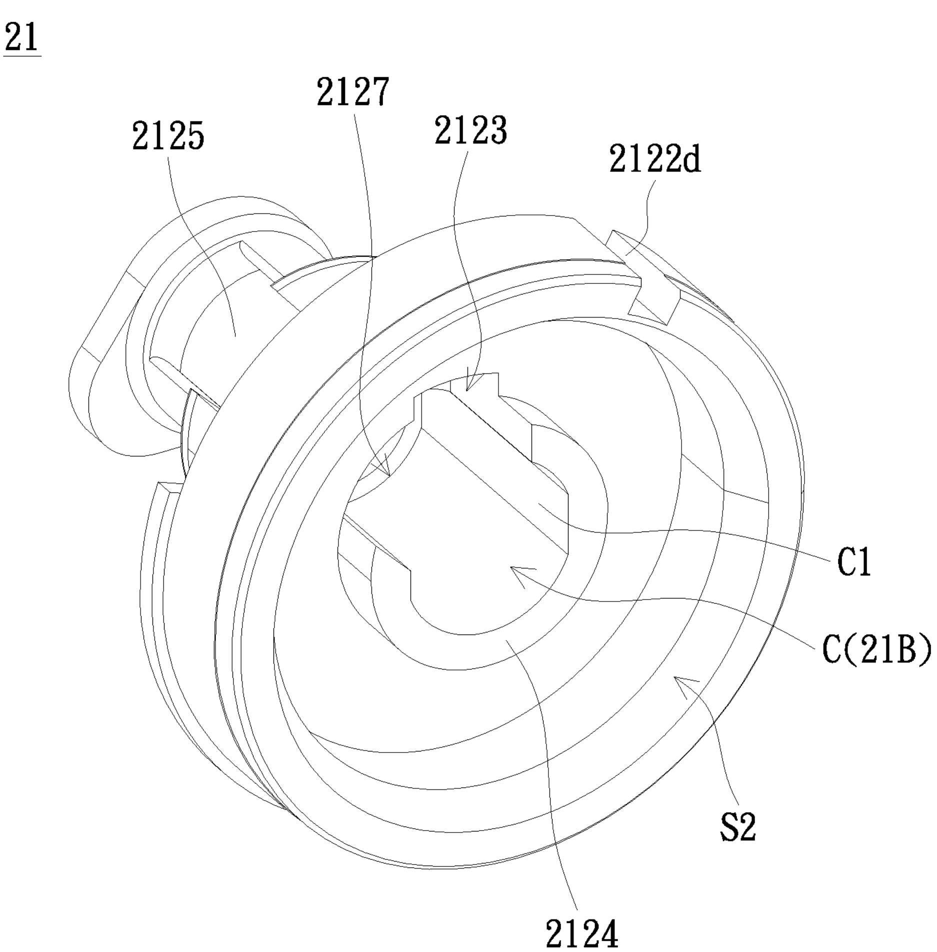
FIG. 5 is a three-dimensional schematic diagram of the first component in FIG. 4 at another viewing angle.

FIG. 3A is a three-dimensional schematic diagram of the axle in FIG. 1A. FIG. 3B is a schematic cross-sectional diagram of the axle, taken along the line A-A in FIG. 3A. FIG. 3C is a schematic cross-sectional diagram of the axle, taken along the line B-B in FIG. 3A. FIG. 4 is a breakdown schematic diagram of the axle in FIG. 3A. FIG. 5 is a three-dimensional schematic diagram of the first component in FIG. 4 at another viewing angle. In FIG. 3A, the A-A section passes the axis of the axle 2 and is perpendicular to a channel 2125; and the B-B section passes the axis of the axle 2 and is perpendicular to a surface of a wiring channel 222.

As shown in FIGS. 1A, 2, 3A, and 4, in this embodiment, the axle 2 includes the first component 21 and the second component 22 as described above. The first component 21 is, for example, a seat body (see FIG. 4) gradually expanded in a stepped shape from the first end 2A to the second end 2B in the extension direction D1. The first component 21 is, for example, made of metal, which can be changed according to demands. The second component 22 is, for example, a bar body (see FIG. 4) extending in the extension direction D1. The second component 22 is, for example, made of a metal, which can be changed according to demands. As shown in FIG. 2, in this embodiment, each of the first component 21 and the second component 22 includes, for example, a hole 23 penetrating through the axis of the axle 2. In other words, the axle 2 may be a hollow bearing internally provided with a cavity, but is not limited to this.

As shown in FIGS. 2 to 3B, in this embodiment, the first component 21 sequentially includes, for example, a mounting section 211 and a sleeve section 212 from the first end 2A to the second end 2B in the extension direction D1. The mounting section 211 has an outer diameter, for example, less than that of the sleeve section 212. The mounting section 211 is close to the first end 2A and is adapted to be connected to the frame and protrude out of the casing 5 (see FIG. 2) during assembly. As shown in FIG. 3A, the end of the mounting section 211 close to the first end 2A is, for example, provided with a flange 211*a*. The flange 211*a* is adapted to be snap-fitted with the frame so that the axle 2 cannot rotate relative to the frame. The flange 211*a* is, for example, a cam, but is not limited to this.

As shown in FIG. 3B, the sleeve section 212 is, for example, provided with a first supporting section 212A and a second supporting section 212B respectively on a radial outer surface from the first end 2A to the second end 2B. The first supporting section 212A is close to the first end 2A, and the casing 5 is rotatably sleeved on the first supporting section 212A during assembly. Specifically, referring to FIGS. 2 to 3B, during assembly, the first supporting section 212A is, for example, located at an opening of the first perforation 501 and covers the first perforation 501. A supporting flange 2121 is, for example, formed on the first supporting section 212A. The supporting flange 2121 is configured to abut against the rolling bearing 53*a* (see FIG. 2) mounted on the body 5A in the extension direction D1, thereby preventing the rolling bearing 53*a* located at the first perforation 501 of the casing 5 from moving towards the second end 2B.

As shown in FIGS. 3A to 3C, the second supporting section 212B is close to the second end 2B of the sleeve section 212 and includes a disc body 2122 extending in the radial direction of the axle 2 and a protruding section 2124 extending towards the second end 2B in the extension direction D1 of the axle 2. The disc body 2122 has a supporting ring 2122*a* surrounding the periphery of the disc body 2122 and extending towards the second end 2B in the extension direction D1. As shown in FIGS. 2 and 3B, the end surface of the supporting ring 2122*a* facing the second end 2B in the extension direction D1 is, for example, located at one end of the sleeve section 212, but is not limited to this. The first mounting portion 21A is located on a surface of the supporting ring 2122*a* (that is, located on a radial-outer surface of the sleeve section 212 of the first component 21).

With regard to the first mounting portion 21A, specifically, as shown in FIGS. 3A and 3B, in this embodiment, the side of the supporting ring 2122*a* close to the first end 2A (that is, one side of the disc body 2122) is provided with a positioning flange 2122*b* protruding in the radial direction, and one side of the positioning flange 2122*b* in the radial direction is provided with a notch 2122*c* recessed towards the axis of the axle 2. One side of the notch 2122*c* is provided with a conduit 2122*d* extending in the extension direction, but is not limited to this.

As shown in FIG. 2, when the stator 3 is assembled with the axle 2, the supporting cambered surface 311 of the electromagnet assembly 31 is in surface contact with an outer ring surface of the supporting ring 2122*a*, and the side of the electromagnet assembly 31 close to the first end 2A abuts against the positioning flange 2122*b*, thereby preventing the electromagnet assembly 31 from moving towards the first end 2A. The snap-fitting disc 32 is connected to the side of the electromagnet assembly 31 close to the first end 2A, and part of the periphery of the snap-fitting disc 32 will enter and abut against the notch 2122*c*, thereby preventing the electromagnet assembly 31 from moving towards the second end 2B. The detailed connection manner of the stator 3 and the axle 2 is not limited to this and can be changed according to demands in other embodiments.

With regard to the second mounting portion 21B, specifically, as shown in FIGS. 3A to 5, a sleeving tube C serving as the second mounting portion 21B is formed on an inner wall surface of the first component 21 close to the second end 2B (that is, a radial-inner side surface of the sleeve section 212), and the length of the sleeving tube C in the extension direction D1 corresponds, for example, to that of the connecting portion 22B and extends from the interior of the first supporting section 212A to the protruding section 2124 of the second supporting section 212B. As shown in FIG. 5, a sliding connection surface C1 facing the axis of the axle 2 is formed on part of an inner wall surface of the sleeving tube C, and the sliding connection surface C1 is configured to be slidably connected to a groove 223 in the second component 22 and can prevent the second component 22 from moving relative to the first component 21 around the axis of the axle 2 when being sleeved on the second mounting portion 21B of the first component 21. The design for preventing the first component 21 and the second component 22 from rotating relative to each other is not limited to this.

As shown in FIGS. 1 to 5, in this embodiment, the first component 21 further includes, for example, a channel 2125 recessed in the radial direction and extending in the extension direction D1. The channel 2125 is adapted to accommodate the power line 6 of the hub motor 1 (see FIGS. 1A and 2). The power line 6 passes the channel 2125 from the exterior of the hub motor 1 to enter the accommodating space S1 and be electrically connected to the stator 3. As shown in FIG. 2, the length of the channel 2125 extends, for example, from the mounting section 211 to the protruding section 2124, the width of the channel 2125 is, for example, equal to the outer diameter of the power line 6, and an opening of the channel 2125 is, for example, oblique relative to the gravity direction and faces upwards, but is not limited to this.

As shown in FIG. 3B, in this embodiment, the channel 2125 includes, for example, a first section 2125*a* and a second section 2125*b*. The first section 2125*a* extends in the extension direction D1 from the mounting section 211 to the part of the sleeve section 212 close to the first end 2A. The second section 2125*b* is located at the other part of the sleeve section 212. As shown in FIG. 3B, the second section 2125*b* includes a first channel notch 2126*a* and a second channel notch 2126*b*. The first channel notch 2126*a* is in communication with a radial outer surface and a radial inner surface of the first supporting section 212A. The second channel notch 2126*b* is located between the first channel notch 2126*a* and the disc body 2122. The disc body 2122 is provided with an open channel 2127 penetrating through the disc body 2122, and the open channel 2127 corresponds to the channel 2125 in position.

As shown in FIGS. 3A to 5, the second section 2125*b* of the channel 2125 is in communication with the interior of the sleeve section 212 by means of the first channel notch 2126*a* and the second channel notch 2126*b*. Thus, as shown in FIG. 3B, when the second component 22 is assembled to the first component 21, the second section 2125*b* of the channel 2125 faces the second component 22, and a wall surface of one part (the connecting portion 22B) of the second component 22 can serve as a bottom surface of the channel 2125, but the detailed design of the channel 2125 is not limited to this.

As shown in FIGS. 2 and 5, in this embodiment, an arrangement space S2 with an opening facing the second end 2B is, for example, enclosed at the part close to the second end 2B by the first component 21 by means of the disc body 2122, the supporting ring 2122*a*, and the protruding section 2124 together. As shown in FIG. 2, during assembly, the end of the supporting seat 414 of the rotor 4 close to the first end 2A may be accommodated in the arrangement space S2, and an end surface of the protruding section 2124 abuts against, for example, the rolling bearings 53*b* (see FIG. 2). In other words, in this embodiment, the first component 21 may assist in positioning the rotor 4 by means of the protruding section 2124, but the detailed assembly relationship of the arrangement space S2, the rotor 4 and the protruding section 2124 is not limited to this.

As shown in FIG. 4, in this embodiment, the second component 22 sequentially includes, for example, the connecting portion 22B and the supporting portion 22A from the first end 2A to the second end 2B. The connecting portion 22B is formed on the side of the second component 22 close to the first end 2A. A radial-outer surface of the connecting portion 22B is recessed in the radial direction to form the groove 223. A bottom surface of the groove 223 forms a sliding-fit surface corresponding to the sliding connection surface C1. The whole connecting portion 22B is sleeved with the second mounting portion 21B (the sleeving tube C) during assembly. The supporting portion 22A is adapted to be slidably connected to and support the rotor 4, the planetary gear set 5C, and the cassette body 5D (support same indirectly by means of the rolling bearing 53*c*), and to support the side cover 5B indirectly by means of the cassette body 5D.

As shown in FIG. 4, the center of the supporting portion 22A close to the second component 22 is provided with a bump 221 protruding out of the outer surface of the second component 22 in the radial direction. The bump 221 is adapted to locate the assembly position of the planetary gear set 5C of the casing 5, but is not limited to this.

As shown in FIGS. 2 and 4, during assembly, the rotor 4 and the planetary gear set 5C of the casing 5 are sleeved on the supporting portion 22A and are located between the protruding section 2124 and the bump 221 (see FIG. 4). In other words, the rotor 4 and the planetary gear set 5C are positioned on the axle 2 from two sides by means of the protruding section 2124 of the first component 21 and the bump 221 of the second component 22 jointly. Thus, in this embodiment, during disassembly, once the whole axle 2 is pulled out of the body 5A of the casing 5, the stator 3, the rotor 4, and the planetary gear set 5C can be simultaneously pulled out of the accommodating space S1, and the rotor 4 and the planetary gear set 5C which are sleeved on the second component 22 can be taken down by separating the first component 21 and the second component 22. In addition, as shown in FIG. 2, in this embodiment, in the radial direction of the axle 2, the disc body 2122 where the stator 3 is located is also indirectly supported by the connecting portion 22B. However, the detailed combination structure is not limited to this.

As shown in FIG. 4, the side of a radial outer surface of the second component 22 different from the side where the groove 223 is located is recessed to form the wiring channel 222 away from the axis of the axle 2, and the wiring channel 222 extends in the extension direction D1 and extends, for example, to the side of the bump 221 close to the second end 2B, but is not limited to this.

As shown in FIGS. 3C to 5, the disc body 2122 further has, for example, a third perforation 2123 penetrating through the disc body 2122 in the extension direction D1. The third perforation 2123 corresponds to the wiring channel 222 in position and is next to and in communication with the open channel 2127 also penetrating through the disc body 2122, but is not limited to this. As shown in FIG. 3C, in this embodiment, the side of the first supporting section 212A close to the disc body 2122 is provided with a side opening 2123*a* opened away from the axle 2 and facing the radial direction of the axle 2. The side opening 2123*a* corresponds to the third perforation 2123 in position. By means of the above-mentioned design, wires (not shown) of the power line 6 entering the accommodating space S1 can be connected to the stator 3, can also penetrate through the third perforation 2123 and the wiring channel 222 to extend towards the second end 2B, and can extend, for example, to the cassette body 5D, but is not limited to this.

By means of the channel 2125 and the wiring channel 222, the axle 2 in this embodiment may be provided with a structure (see FIG. 2) allowing the wires to extend and have relatively high strength without being provided with a hole for communicating an outer surface and an inner surface of the axle 2. As shown in FIG. 3B, in this embodiment, although the part of the first component 21 at the channel 2125 is provided with the first channel notch 2126*a*, the second channel notch 2126*b* and the side opening 2123*a* for communicating the radial outer surface and the radial inner surface of the axle 2, the first channel notch 2126*a*, the second channel notch 2126*b*, and the side opening 2123*a* will be covered by the second component 22 when the first component 21 and the second component 22 are combined (as shown in FIGS. 2, 3A, and 3B). The hole 23 of the axle 2 cannot affect the structure allowing the wires to extend, so that in other embodiments of the present disclosure, the axle 2 may be a solid shaft body.

According to the above description, in the hub motor of the present disclosure, the axle is divided into the first component to which the stator is fixedly connected and the second component on which the rotor is rotatably sleeved, the first component is detachably sleeved on the second component, and the first component and the second component cannot rotate relative to each other after being sleeved. Thus, the hub motor has the advantages of convenience in mounting and positioning, the mounting accuracy of the various assemblies can be improved, and the assemblies of the hub motor can be prevented from producing errors due to wear caused by the torque.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A hub motor adapted to be mounted on a bicycle, the hub motor comprising:

an axle, fixed to a frame of the bicycle and having a first end and a second end opposite each other in an extension direction;

a rotor, sleeved on the axle and pivoting with the axle as an axis;

a stator, fixed to the axle and adjacent to the rotor; and a casing, sleeved on the axle and driven by the rotor to pivot with the axle as an axis, wherein the casing has an accommodating space, a first perforation, and a second perforation opposite to the first perforation, and the accommodating space accommodates the stator and the rotor;

wherein the axle comprises a first component and a second component in the extension direction, the first component is sleeved on the second component, the first component is arranged to pass through the first perforation and comprises a first mounting portion and a second mounting portion located in the accommodating space, the first mounting portion is fixedly connected to the stator, the second mounting portion is connected to the second component, the second component is arranged to pass through the second perforation and comprises a supporting portion and a connecting portion located in the accommodating space, the rotor is rotatably sleeved on the supporting portion, the second mounting portion is detachably sleeved on the connecting portion, and the first component and the second component cannot rotate relative to each other after being sleeved, wherein the first component comprises a mounting section and a sleeve section in the extension direction, the mounting section is close to the first end and is adapted to be connected to the frame, the casing is rotatably sleeved on the sleeve section, the first mounting portion is arranged on a radial-outer side of the sleeve section, and the second mounting portion is arranged on a radial-inner side of the sleeve section, the sleeve section comprises a disc body and a supporting ring, the disc body extends in a radial direction of the axle, the supporting ring surrounds the disc body, and the stator is sleeved on the supporting ring.

2. The hub motor according to claim 1, wherein a radial-outer surface of the connecting portion is provided with a groove recessed towards the axis of the axle in a radial direction, and the groove has a sliding-fit surface.

3. The hub motor according to claim 1, wherein an arrangement space is enclosed by the supporting ring, and the rotor is at least partially arranged in the arrangement space.

4. The hub motor according to claim 3, wherein the second component comprises a bump extending in the radial direction, the sleeve section has a protruding section in the extension direction in the arrangement space, and the rotor is sleeved between the protruding section and the bump.

5. The hub motor according to claim 1, wherein the disc body has a third perforation in the extension direction, and the second component is recessed in the radial direction to form a wiring channel corresponding to the third perforation and extending in the extension direction.

6. The hub motor according to claim 1, wherein an end of the mounting section close to the first end is provided with a flange, and the flange is adapted to be snap-fitted with the frame.

7. The hub motor according to claim 1, wherein the first component comprises a channel recessed in the radial direction and extending in the extension direction, and the channel is adapted to accommodate a power line electrically connected to the stator.

8. The hub motor according to claim 7, wherein the channel comprises a first section and a second section, the first section is located in the mounting section, the second section is located in the sleeve section, and the second section is in communication with an interior of the sleeve section to face the first component.

* * * * *